United States Patent
Pasin

[15] 3,664,963
[45] May 23, 1972

[54] ENCAPSULATION PROCESS

[72] Inventor: Joseph Z. Pasin, New York City, N.Y.

[73] Assignee: Balchem Corporation, Slate Hill, N.Y.

[22] Filed: Oct. 22, 1969

[21] Appl. No.: 868,619

[52] U.S. Cl. .................................. 252/316, 71/3, 71/64 A, 99/140 R, 99/166, 117/100 A, 252/522, 264/4, 424/32, 424/33, 424/34, 424/35, 424/36, 424/37
[51] Int. Cl. ........................................ B01j 13/02, B44d 1/02
[58] Field of Search ............. 252/316; 117/100 A, 81; 264/4; 99/140 R; 424/34, 35, 36

[56] References Cited

UNITED STATES PATENTS

| | | | |
|---|---|---|---|
| 2,828,206 | 3/1958 | Rosenberg | 424/35 X |
| 3,056,728 | 10/1962 | Ohtaki | 424/34 X |
| 3,139,383 | 6/1964 | Neville, Jr. | 424/35 X |
| 3,159,585 | 12/1964 | Evans et al. | 252/316 |
| 3,265,629 | 8/1966 | Jensen | 252/316 |
| 3,516,942 | 6/1970 | Scarpelli | 252/316 |

*Primary Examiner*—Richard D. Lovering
*Attorney*—Birch, Swindler, McKie & Beckett

[57] ABSTRACT

A process for encapsulating an active material in a shell composition in which the capsule composition is formed by dispersing an active material and a shell composition in a solvent for the shell composition. Capsules are prepared by spraying the capsule composition into a bath of an anhydrous lower molecular weight polyglycol. The spraying operation serves to form the capsule composition into particles containing the active material as a dispersed phase in a solution of the shell composition and the lower molecular weight polyglycol serves to remove the solvent from the shell composition solution.

8 Claims, No Drawings

ENCAPSULATION PROCESS

FIELD OF INVENTION

The present invention relates to an encapsulation process. More particularly, the present invention is directed to an improved process for encapsulating active materials in which a spraying operation serves to form discrete liquid particles and a lower molecular polyglycol is employed to desolventize the capsule composition.

BACKGROUND OF INVENTION

In most microencapsulation processes, one or more materials to be encapsulated, referred to herein as the "active materials," are dispersed in a shell forming composition, referred to herein as the "shell composition." The active material may be finely divided solids, granular solids, liquids, or, in exceptional cases, gases.

The shell composition is either a single material or a combination of materials which is capable of forming an external continuous phase. The active material generally is in the form of an internal discontinuous or dispersed phase. In some cases, the active material may be dissolved in the shell composition without forming a distinct phase within the shell composition.

While it is sometimes possible, or even preferable, to employ the shell composition in a molten state, free of solvents, in most cases the shell composition is dissolved in a volatile or extractable solvent.

A capsule composition is prepared by dispersing the active material and the shell composition in a solvent for the shell composition. The capsule composition is formed into a homogeneous dispersion of sufficient stability to resist stratification during the subsequent steps of capsule formations. The capsule formation steps comprise, broadly, forming the capsule composition into particles and removing the shell composition solvent.

In the formation of capsules, the capsule composition is generally mechanically broken up to form microparticles. Each microparticle contains a proportionate quantity of the active material as a dispersed phase in the shell composition solution. In order to form a solid capsule, the solvent of the shell composition must be substantially removed. Obviously, it is desirable to remove the shell composition solvent with only minimal losses of the active material.

In the past, the mechanical breaking up of the capsule base in the removal of solvent from the shell composition has been accomplished by spray drying. In spray drying, the capsule composition is sprayed into a large volume of air or inert gas at a temperature which is sufficiently high to remove the volatile solvent from the particles by evaporation. It is apparent that in the spray drying process the particles of the capsule composition are exposed to elevated temperatures. Furthermore, unless an inert gas is used, the capsules are in contact with large amounts of oxygen.

The elevated temperatures used in spray drying operations tend to volatilize all or part of the most volatile components of the active material. This is a particularly serious problem when the active material comprises very volatile materials such as flavoring oils. The elevated temperatures of the spray drying process also tend to degrade any heat sensitive active materials. If the capsule composition is sprayed into air, there is the danger of oxidizing any oxidation prone materials.

With respect to compositions containing flammable or explosive solvents, spray drying is hazardous, this necessitating the use of nonflammable solvents in the capsule composition or an inert gas spray drying medium. Either of these expedients cause substantial increase in the cost of the operation, without necessarily overcoming the disadvantages inherent in the spray drying process.

Another disadvantage of spray drying is that shell materials which melt or become tacky at the temperature of the spray drying operation frequently fuse into one solid mass or stick to the inner surfaces of the spray dryer and thus become useless.

Many of the disadvantages of the spray drying technique can be overcome by using a process in which the solvent of the shell composition is removed with an anhydrous alcohol. A capsule composition, in which water is the solvent of the shell composition, may be broken down mechanically into discrete particles by dispersing it with moderate agitation in a suitable liquid. The liquid should be one in which the shell composition is insoluble and which is capable of keeping the particles of the capsule composition from coagulating or coalescing during the subsequent dehydration step. Examples of suitable liquids include mineral oil or vegetable oil. The oil medium may contain an alcohol, such as ethanol, isopropanol, or propanol, to provide partial dehydration simultaneously with capsule formation. Dehydration is completed by a subsequent treatment with an anhydrous alcohol. Such a process is described in copending application, Ser. No. 719,816, "Encapsulation of Aroma and Flavors", now U.S. Pat. No. 3,495,988 which application is a continuation-in-part of application, Ser. No. 348,325, now abandoned.

This process gives satisfactory results in the encapsulation of the active materials which are insoluble, or only moderately soluble, in alcohol. However, the alcohol, with its low molecular weight, is capable of penetrating many suitable shell materials. The alcohol will than frequently extract, during the dehydration step, a substantial portion of the active material. Active material losses in this manner can easily exceed acceptable limits. Furthermore, the dehydrating alcohol leaves a residual solvent odor in or upon some of the capsule materials. This odor is difficult to remove from the capsules without substantial loss of active materials. The residual solvent odor of materials such as denatured alcohol or insopropanol is, of course, particularly objectionable with respect to encapsulated flavors, aromas, and fragrances.

In copending application, Ser. No. 868,637 of Leslie L. Balassa, "Encapsulation Process," a process is disclosed in which lower molecular weight polyglycols are employed to desolventize shell compositions. Such a process overcomes the disadvantages of spray drying processes as well as the disadvantages of the oil-suspension-low molecular weight alcohol dehydration process. The present invention represents an improvement over the lower molecular weight polyglycol desolventization processes in that it may be adapted to yield capsules of smaller size and more nearly spherical in shape.

SUMMARY OF INVENTION

The present invention is directed to a process of encapsulating active material in a shell composition in which a spraying operation is used to form discrete liquid particles and a lower molecular weight polyglycol is used to desolventize the capsule composition particles. In accordance with the present invention, a capsule composition is formed by dispersing an active material and a shell composition in a solvent for the shell composition, the capsule composition is formed into particles containing the active material as a dispersed phase in a solution of the shell composition by spraying the capsule composition through a gaseous medium, and solid capsules are formed by collecting the capsule composition particles in a lower molecular weight polyglycol whereby the polyglycol acts to desolventize the capsule composition particles.

DETAILED DESCRIPTION OF THE INVENTION:

The active materials which may be encapsulated by the process of the present invention may be either soluble or insoluble in the shell composition or the shell composition solvent. The active materials may be food flavors, aromas, fragrances, agricultural chemicals such as insecticides, herbicides, and fertilizers, medicinal compounds, such as vitamins and drugs, etc. Specific examples of suitable active materials include lemon oil, orange oil, pineapple aroma, citric acid, caffeine, ammonium ascorbate, etc.

The shell material should be a material which is soluble in either water or organic solvents, gellable, and capable of forming substantially air-impervious capsules when desolventized. Suitable water soluble or water dispersible shell materials include hydrophylic polymers such as natural gums (e.g., gum acacia, locust bean gum, gum tragacanth), starches or modified starches (e.g., starch ethers and esters, dextrins, enzyme-treated starches), water-soluble cellulose compounds (e.g., alkali cellulose, cellulose ethers and esters), proteins (e.g., casein, gelatin, soy protein, gluten, egg and blood albumin and their various modifications and alkali derivatives), sugars (e.g., sucrose, glucose, lactose, sorbitol, mannitol), various synthetic materials (e.g., polyvinyl alcohol, polyvinyl pyrrolidone, carboxylated styrene, styrene-maleic acid condensates), etc.

Suitable organic solvent soluble shell materials include cellulose and starch esters and ethers, epoxy resins, polyvinyl resins, alkyd resins, phenol-formaldehyde resins, shellac, dammar resin, asphalt, gilsonite, and numerous other natural and synthetic resins and polymeric materials.

The first step in the encapsulation process of the present invention is the preparation of the shell composition. This generally involves dissolving the shell material in a suitable solvent, for example, dissolving acacia gum in water or an asphalt in carbon tetrachloride. If the active material is soluble in the shell material solvent, the active material may be dissolved in solvent prior to dissolution of the shell material.

In preparing the shell composition solution, it is preferred to use the minimum practical amount of solvent. Sufficient solvent should be used so that the resultant shell composition solution has a viscosity no higher than is practicable to handle with available equipment. It may be necessary to employ solvent concentrations as high as 90 percent by weight of the shell composition solution with high viscosity shell materials, while concentrations as low as 20 percent by weight are suitable with very low viscosity shell materials. For example, a shell composition solution of 10 percent by weight of high viscosity methyl cellulose dissolved in 90 percent by weight water is suitable, as is a shell composition solution of 80 percent by weight sorbitol and 20 percent by weight water.

After the shell composition solution has been prepared, or during the preparation of the solution, antioxidants, preservatives, surfactants, plasticizers, or other modifiers may be added, if desired. The modifiers are mixed with the shell composition solution until a homogeneous composition is obtained.

The capsule composition is formed by dispersing the active material and the shell material in the shell composition solvent. Usually, the active material is dispersed in a solution of shell composition. However, in some instances, such as when the active material is soluble in the solvent, the active material may be added to the solvent first, or the active material and the shell composition may be added simultaneously. The dispersion of the active material may be accomplished by any suitable means such as by a closed turbine high shear mixer or by a pressure homogenizer. The term "dispersion," as used herein, refers to either a solution or a homongeneous mixture of discrete particles distributed throughout the solvent.

The concentration of the active ingredients used in the capsules is governed by the performance requirements of the capsules. In general, for reasons of economy it is desirable to use the maximum amount of active material in the capsule which will meet performance requirements. In some cases, to meet certain dosage requirements, the amount of active material incorporated into the capsule may be 1 percent or less by weight of the capsule. To control taste characteristics, it may be necessary to employ less active material than could otherwise be employed. In other instances, taste characteristics may be controlled by coating the capsules with 1 or 2 percent by weight of aluminum stearate.

The fluid or paste-like capsule composition is introduced into an anhydrous polyglycol in the form of small discrete liquid particles obtained by spraying the capsule composition into a gaseous medium. Spraying can be accomplished using any suitable equipment, such as pressure spray equipment. An adequate spray may be achieved merely by passing the capsule composition through a conventional shower head. For ease of operation and economy, air is the preferred gaseous medium. Inert gases, such as nitrogen, helium, etc. can also be used, as can special atmospheres of various types.

After spraying, the resultant particles are collected in a polyglycol. Once the particles are collected in the polyglycol they are preferably kept in constant motion for a sufficient length of time for the solvent to be extracted from the particles by the polyglycol and to harden to set the particles into capsules.

The desolventized solid capsules may be separated from the polyglycol by filtering or centrifuging.

The amount of polyglycol used to desolventize the capsule composition can be varied over a relatively large range. The amount of polyglycol employed is somewhat dependant upon the amount of solvent to be extracted and the volume of the capsule composition. It is necessary to employ a sufficient amount of polyglycol to (1) assure extraction of the solvent within a reasonable period of time, and (2) allow free movement of the capsule composition at all stages of solvent extraction. These conditions are generally adequately satisfied if ratios by weight of capsule composition to polyglycol of between 1:5 and 1:30 are employed. Preferably a ratio of 10 parts by weight polyglycol to 1 part by weight capsule composition is employed in the solvent extraction step.

The water or organic solvent extraction of the capsules may be carried out at any temperature between the freezing point and the boiling point of the polyglycol employed. When encapsulating volatile materials or materials which are degraded or decomposed at elevated temperatures, the capsule composition is prepared at as low a temperature as is feasible and the polyglycol is employed at a temperature at or just above its freezing point. If the active material is not heat-sensitive, then the desolventizing of the capsule may be carried out at higher temperatures. Those skilled in the art may readily determine the optimum temperature of operation consistent with the properties of the active material and the polyglycol.

If desired, the desolventizing operation may be carried out under vacuum or while passing air or other gases through the polyglycol-capsule composition mixture to sweep solvents from the polyglycol.

Polyglycols suitable for use with the present invention include those having molecular weights in the range of about 106 (diethylene glycol) to about 2,000. Polyglycols within the upper end of this molecular weight range are not desirable for desolventizing aqueous capsule compositions (dehydrating), but are suitable for desolventizing capsule compositions in which an organic solvent is employed. Preferred desolventizing materials are polyglycols having molecular weights within the range of about 190 to about 785. Particularly preferred are polyethylene glycols with the generalized formula $HOCH_2(CH_2OCH_{2n}\ CH_2OH$ (in which "$n$" represents the average number of oxyethylene groups) having average molecular weights ranging from 190 to 630 (available commercially as CARBOWAX polyethylene glycols). Also preferred are methoxy polyethylene glycol having molecular weights in the range of 335 to 785 (available commercially as CARBOWAX methoxy polyethylene glycols). Diverse other polyglycols such as polypropylene, polybutylene, and polystyrene glycols and their combinations, may also be employed.

Polyglycols in the average molecular weight ranges of about 106 to about 2,000 are viscous, hygroscopic liquids compatible with a large number of organic solvents which are useful in the preparation of capsule shell composition solutions. The viscosity of the polyglycols, combined with their physical structure and lubricity, makes possible the formation of dispersed capsule slurries in which the capsules will not coalesce while the polyglycols dehydrate or desolventize the capsule particles.

An outstanding property of polyglycols is that they are incompatible with, or at least they are not solvents for, many of the materials commonly used for capsule shell compositions.

Furthermore, the comparatively large glycol molecules do not penetrate beyond the surface of most of the capsule shells and therefore the major portion of the active material contained in the capsule composition remains within the confines of the capsule, protected by the shell, while the low molecular weight solvents are extracted from the shell. The shell material, acting as a semi-permeable membrane, allows the low molecular weight solvents to diffuse through it, while the larger molecules of the active material are retained.

After recovery of the desolventized capsules from the polyglycol, the polyglycol adhering to the capsules may be removed by washing with a suitable material, such as a suitable organic solvent or with water if the shell material is water insoluble.

In some cases, such as in the encapsulation of food flavors, aromas, and fragrances, it may be advantageous to allow a film of polyglycol to remain on the capsule. The film acts as a barrier to oxygen penetration. Since properly prepared polyglycols are tasteless, odor-free, and non-toxic, they are considered to be suitable for use with food and food additives.

The polyglycol used in the desolventizing of the capsules may contain various additives. These additives may be designed to protect the capsules or the active materials within the capsules or to obtain special effects more conveniently or more effectively than can be obtained by incorporating the materials into the capsules. Examples of various materials which may be added to the polyglycol include antioxidants, fungicides, bactericides, dyes, pigments, etc.

Materials such as colloidal silica, starch, talc, and other absorbent or lubricating materials may also be applied to the surface of the capsule in order to achieve a drier and more free-flowing surface.

The desolventizing operation can be accelerated by first spraying the capsule composition into a viscous white mineral oil. The mineral oil-capsule composition mixture is admixed with an anhydrous polyglycol containing a sufficient quantity of a mutual solvent for the mineral oil and the polyglycol to render the mineral oil and the polyglycol at least partially compatible.

The following examples are given to further illustrate the invention; they are merely exemplary and are in no way limiting.

EXAMPLE 1

This example is for purposes of comparison and does not involve the use of the spraying technique of the present invention.

A. Preparation of the Shell Composition and Solution

Five hundred grams of water were heated to boil and 500 grams dextrin (National Starch and Chemical Corporation, 78-1523) was added with rapid and efficient mixing, using a closed turbine, high shear mixer (Barrington CONVERTI JET Model CJ–5B). Mixing was continued until a homogeneous solution was obtained.

B. Preparation of Lemon Oil Capsule Composition

Eighty-one grams of lemon oil (California cold pressed oil) was emulsified in 300 grams of the shell composition solution (A) by means of a homogenizing mixer (Barrington CONVERTI JET Model CJ–5B operated as a closed turbine unit). At the start of the operation the temperature of the shell composition solution was 25° and the lemon oil 15° C. The operation of mixer caused an increase of the temperature to 40° by the time emulsification was completed.

C. Capsule Formation and Dehydration

One thousand grams of polyethylene glycol having an average molecular weight of 400 (Union Carbide Corporation, Carbowax 400) was placed in a vessel equipped with a homogenizing mixer (Barrington CONVERTI JET Model CJ–5B operated as an open turbine unit). One hundred grams of the lemon oil capsule composition (B) was introduced into the polyethylene glycol in a thin stream with steady medium speed operation of the mixer (about 1,500 rpm shaft speed). By the action of the mixer, the lemon oil emulsion was broken up into coarse liquid particles, which, in contact with the polyethylene glycol, were rapidly converted into gel particles and finally into virtually anhydrous capsule granules.

The capsule granules were separated from the excess polyethylene glycol by means of a basket centrifuge.

The dry capsules contained 25 percent by weight lemon oil and about 20 percent by weight polyethylene glycol adsorbed on the surface. The capsules dissolved rapidly in cold water and had the natural fresh flavor of the original lemon oil. The capsules retained their fresh flavor even after extended storage in the presence of air.

The lemon oil retained in the capsules was found to be about 90 percent by weight of the total oil used. In calculating the oil retained and the oil content of the capsules, the adhering polyethylene glycol was considered as part of the capsule weight.

EXAMPLE 2

The procedure of Example 1 was followed except that during Step C (Capsule Formation and Dehydration), the lemon oil capsule composition (B) was sprayed into an air space above the polyethylene glycol. The sprayed particles were collected in the polyethylene glycol which was constantly agitated so that the sprayed particles could be incorporated in the shortest possible time.

The capsules obtained were smaller in particle size and more nearly spherical than those obtained by the procedure of Example 1. The properties of the capsules, in all other respects, were very similar to those of Example 1.

EXAMPLE 3

This example is for purposes of comparison and does not involve the use of the spraying technique of the present invention. It illustrates the use of an active material which is soluble in the shell composition solvent.

A. Preparation of the Capsule Composition

Four hundred grams of dextrin (Corn Products Co., Mor-Rex P–932) was dissolved in a 1 percent by weight aqueous pineapple aroma solution at a temperature of 23° C. The mixture was rapidly mixed, using a closed-turbine mixer.

B. Capsule Formation and Dehydration

One thousand grams of polyethylene glycol (Union Carbide Corporation, Carbowax 600) was placed in a vessel equipped with a variable-speed open-turbine mixer. One hundred grams of the pineapple aroma capsule composition (A) was introduced into the polyethylene glycol in a thin stream with steady medium speed operation of the mixer. By action of the mixer the capsule composition was broken up into coarse liquid particles which, in contact with the polyethylene glycol, were rapidly converted into gel particles and finally into virtually anhydrous capsule granules.

The capsule granules were separated from the polyethylene glycol by means of a basket centrifuge and the resultant capsules were washed with anhydrous ethanol to remove polyethylene glycol adhering to the capsules.

EXAMPLE 4

The procedure of Example 3 was followed except that during Step B (Capsule Formation and Dehydration), the pineapple aroma capsule composition (A) was sprayed into an air space above the polyethylene glycol. The sprayed particles were allowed to fall into agitating polyethylene glycol. The capsules recovered were of a fairly uniform size, small, and nearly spherical.

What is claimed is:

1. A process for encapsulating an encapsulatable active material, comprising the steps of:
   a. distributing said active material and a shell-forming component in a liquid which is a solvent for said shell-forming component, to provide a capsule composition;
   b. forming said capsule composition into small discrete liquid particles by spraying said capsule composition into a gaseous medium;
   c. collecting said liquid particles in a body of an anhydrous liquid polyglycol having an average molecular weight between about 106 and about 2,000 and maintaining said particles in contact with said polyglycol for a sufficient period of time to substantially extract the solvent from said particles and simultaneously to transform said particles into solid capsules, and,
   d. separating the solid capsules from the polyglycol.

2. The process of claim 1 in which the weight ratio of capsule composition to polyglycol in step (c) is between about 1:5 and about 1:30.

3. The process of claim 1 in which the extraction in step (c) is carried out at a temperature between the freezing point and the boiling point of the polyglycol.

4. The process of claim 1 in which the polyglycol is a polyethylene glycol having a molecular weight between about 190 and about 630.

5. The process of claim 1 in which in step (b) the capsule composition is sprayed through said gaseous medium into a viscous white mineral oil in forming said small discrete liquid particles, and in which the polyglycol in step (c) contains a sufficient quantity of a mutual solvent for said mineral oil and said polyglycol to render said mineral oil and said polyglycol at least partially compatible.

6. The process of claim 1 in which said shell-forming component is selected from the group consisting of a natural gum, a starch, a starch ether, a starch ester, a dextrin, a protein, a sugar, a synthetic resin, gilsonite, and asphalt.

7. The process of claim 1 in which the solvent is in water.

8. The process of claim 1 in which the solvent is an organic solvent.

* * * * *